United States Patent
Persico

(10) Patent No.: US 7,677,876 B2
(45) Date of Patent: Mar. 16, 2010

(54) DIE WITH CONTROLLED BREATHER FOR ROTATIONAL PRESSING

(75) Inventor: Claudia Persico, Alzano Lombardo BG (IT)

(73) Assignee: Persico S.p.A., Nembro BG (IT)

( * ) Notice: Subject to any disclaimer, the term of this patent is extended or adjusted under 35 U.S.C. 154(b) by 389 days.

(21) Appl. No.: 11/653,367

(22) Filed: Jan. 16, 2007

(65) Prior Publication Data

US 2007/0166424 A1 Jul. 19, 2007

(30) Foreign Application Priority Data

Jan. 16, 2006 (IT) .......................... MI2006A0055

(51) Int. Cl.
*B29C 33/10* (2006.01)
(52) U.S. Cl. ...................... 425/146; 425/812
(58) Field of Classification Search ................. 427/135, 427/146, 149, 143–144, 425, 435, 472, 812; 425/135, 146, 149, 143–144, 425, 435, 472, 425/812

See application file for complete search history.

(56) References Cited

U.S. PATENT DOCUMENTS

| | | | |
|---|---|---|---|
| 3,914,361 A | 10/1975 | Shiina et al. | |
| 4,691,755 A | 9/1987 | Kuriyama et al. | |
| 4,779,667 A * | 10/1988 | Fujino et al. | 425/812 |
| 6,367,765 B1 * | 4/2002 | Wieder | 425/130 |
| 7,114,944 B2 * | 10/2006 | Wolfe et al. | 425/472 |
| 7,481,642 B2 * | 1/2009 | Niewels | 425/146 |

FOREIGN PATENT DOCUMENTS

| | | |
|---|---|---|
| AU | 42009/96 | 7/1996 |
| DE | 44 28 974 | 2/1996 |
| JP | 61-49819 | 3/1996 |
| WO | WO 96/12601 | 5/1996 |
| WO | WO 2005/069937 | 8/2005 |

OTHER PUBLICATIONS

European Search Report dated May 19, 2008.

* cited by examiner

*Primary Examiner*—Yogendra Gupta
*Assistant Examiner*—Thu Khanh T Nguyen
(74) *Attorney, Agent, or Firm*—Jacobson Holman PLLC

(57) ABSTRACT

A die for rotational pressing includes a breather device for connection of the interior of the die with the exterior and which has a passage between the interior and the exterior of the die equipped with a valve operated by an actuator piloted by a handling controller for opening the passage after a first step of the pressing process. The valve allows the breather of the internal pressure of the die and/or controlled injection of air under pressure into the die.

10 Claims, 2 Drawing Sheets

DIE WITH CONTROLLED BREATHER FOR ROTATIONAL PRESSING

BACKGROUND OF THE INVENTION

1. Field of the Invention

This invention relates to a die with controlled breather for use in rotational pressing.

2. State of the Prior Art

In rotational pressing it is indispensable to apply on the dies a breather whose purpose is to maintain atmospheric pressure inside the die during the pressing process. Indeed, if the die were completely closed during the heating step there would be an increase in pressure which might cause escape of material through the flanges or breakage of the die. In addition, during the cooling step there might be a pressure decrease which would generate air sucked through the flanges of the die or a deformation of the part.

The breather is usually a simple hole, often with a tube, which puts the interior of the die in communication with the external environment. To avoid material coming out of this hole during pressing, filters are inserted, very often consisting of steel wool.

During the initial step of pressing the still powdered plastic material ends up by depositing on the filter, then melting and solidifying during cooling. This leads in a short time to obstruction of the breather.

Management of these breathers is entrusted to an operator who at each pressing cycle must clean the breather and replace the filters. Negligence in this operation leads to obstruction of the breather with resulting defects in the pressed part or damage of the die.

The general purpose of this invention is to remedy the above-mentioned shortcomings by making available a more efficient breather system with innovative characteristics.

SUMMARY OF THE INVENTION

In view of this purpose it was sought to provide in accordance with this invention a rotational die including a breather device for connection of the interior of the die with the exterior and characterized in that said device includes a passage between the interior and the exterior of the die which is equipped with a valve operated by an actuator piloted by a handling controller for opening a passage after a first step of the pressing process.

BRIEF DESCRIPTION OF THE DRAWINGS

To clarify the explanation of the innovative principles of this invention and its advantages compared with the prior art there is described below with the aid of the annexed drawings a possible embodiment thereof by way of non-limiting example applying said principles. In the drawings.

DETAILED DESCRIPTION OF THE INVENTION

Figure 1:
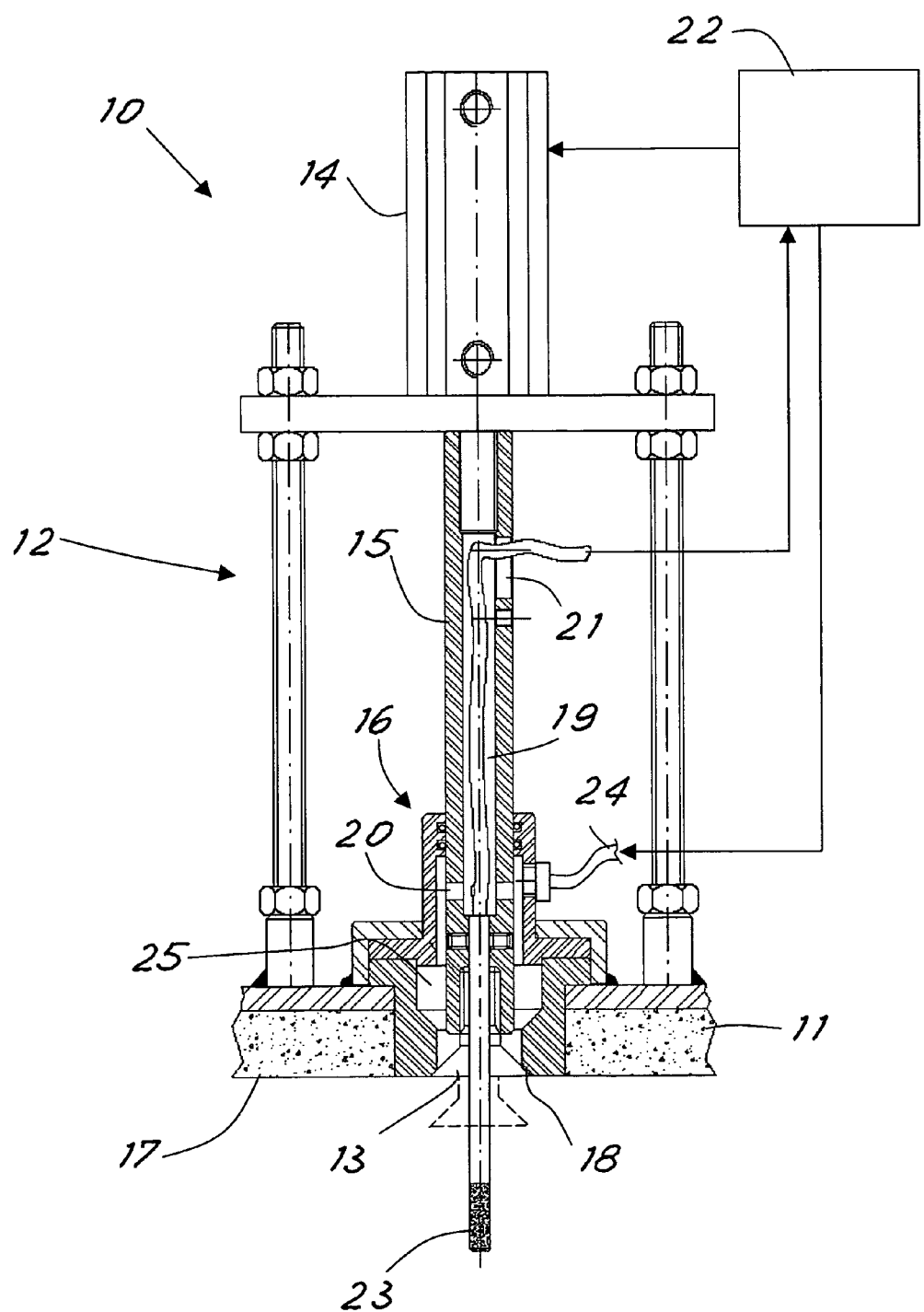
FIG. 1 shows a diagrammatic partially cross-sectioned view of a die with a breather system in accordance with this invention.

With reference to the figures, FIG. 1 shows partially a rotational die with breather system in accordance with this invention. The die is designated as a whole by reference number 10 and includes a die shell 11 and at least one controlled breather device 12. The controlled breather system includes in turn a breather valve equipped with a shutter 13 which is movable between a closed position (shown in solid lines) and an open position (shown in broken lines) by means of an actuator 14 (controlled by a suitable controller 22).

The actuator 14 is connected to the shutter 13 by means of a control rod 15 which crosses sealed a valve body 16 facing inward 17 of the die to realize a striking seat 18 for valve 13 when in closed position. Advantageously the shutter 13 has a closing surface which is conical and tapers towards the outside of the die.

Again advantageously, the valve has the control rod 15 which is pierced axially at 19 and has radial passages 20 inside the valve body and at least one breather opening 21 on the outside. In this manner, when the valve is moved into the open position there is communication between the inside of the die and the external environment through the passages 20, the axial duct 19 and the external passage 21.

In accordance with principles of this invention it is possible to place inside the breather detection probes, for example, as shown in 23, a thermal probe connected to the controller 22 to project from the valve into the die and detect the temperature inside the die.

Again in accordance with the principles of this invention it is possible to connect to the breather a source of air under pressure 24 so as to be able to input air into the die on command of the controller 22.

In the realization of FIG. 1 the source is connected to the body 16 to inject air into the chamber 25 of the valve so that the air under pressure enters on command into the die when the valve is open and passes through the valve opening.

During the initial heating step of the pressed part the breather remains closed so as to avoid plastic material not yet completely melted from coming out of the die.

After reaching a predetermined breather condition (for example, a desired temperature set by the operator and detected by the sensor) the controller 22 opens the breather to allow passage of the gases outward. The plastic material, being completely melted, can no longer go out.

With the die open, when the geometry of the part allows it, inlet of air through the source 24 also allows expulsion of the pressed article from the die. To perform this operation, a large quantity of air is injected into the pressed part which, due to the effect of the pressure generated, is expelled from the die.

During the part cooling step it is also possible to inject low-pressure air, for example, in case of pressed parts with very broad flat parts to avoid deformation and humps. Cooling is also accelerated.

Figure 2:
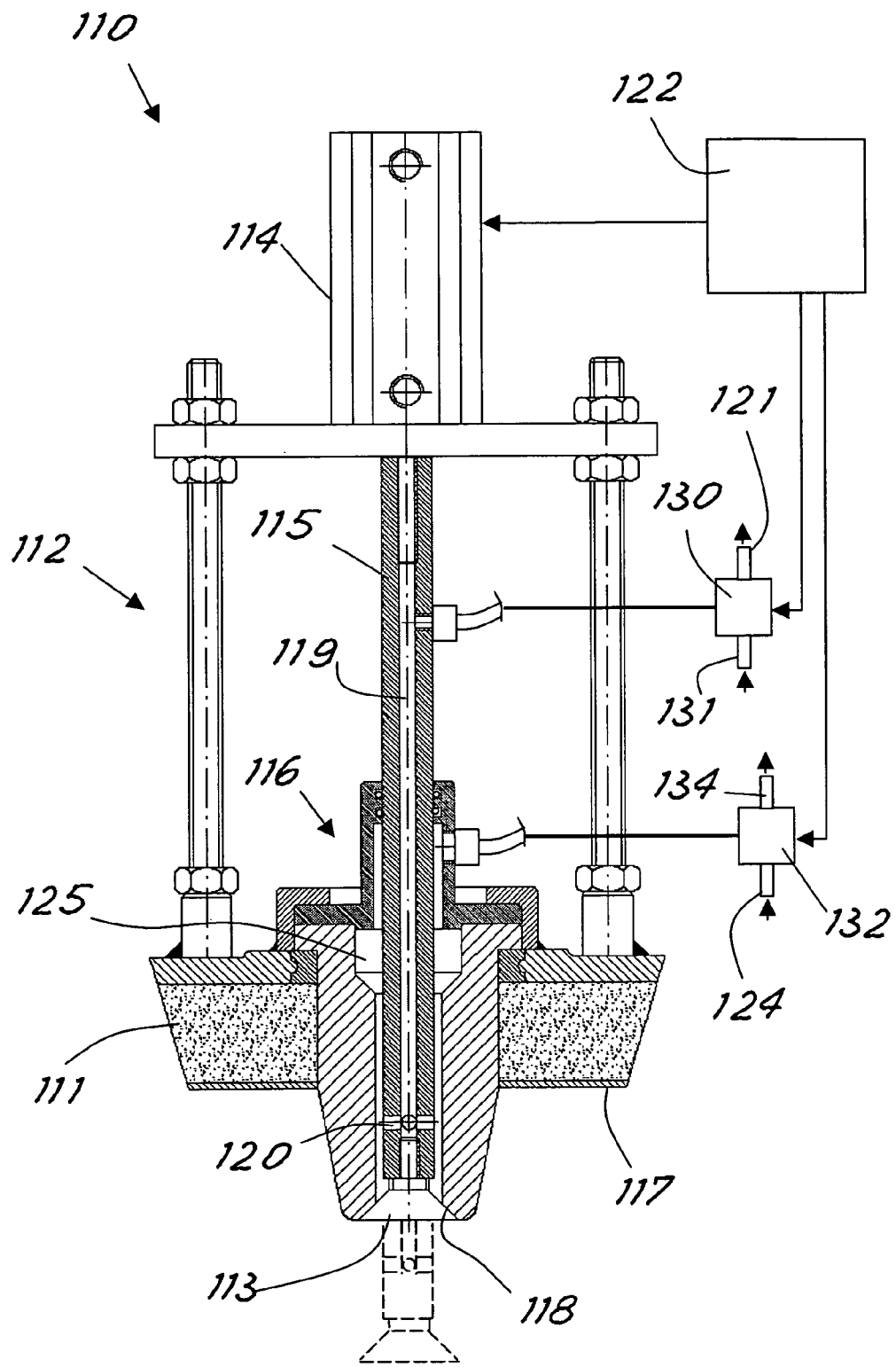
FIG. 2 shows a view similar to that of FIG. 1 of a second realization of a die with a breather system in accordance with this invention.

FIG. 2 show a second realization of a die realized in accordance with the principles of this invention. For description convenience, the realization of FIG. 2 has parts similar to those of the realization of FIG. 1 which are indicated with the same number increased by 100. There is thus the die of FIG. 2 designated as a whole by reference number 110 and which includes a die shell 111 and at least one controlled breather device 112 which includes in turn a breather valve having a shutter 113 operated by an actuator 114 through a control rod 115 which traverses sealed a valve body 116. In the realization shown in FIG. 2 the valve body has a seat 118 as striker of the shutter 113 projecting from the wall 117 of the interior of the die.

The control rod 115 is pierced axially by a duct 119 and has radial passages 120 immediately before the shutter 113. Advantageously the duct 119 is connected to a controlled valve 130 for its alternative connection to a discharge 121 or to a source of compressed air 131.

Again advantageously, the chamber 125 inside the body 116 for passage of the breather valve rod is connected to a controlled valve 132 for its alternative connection to a discharge 134 or to a source of compressed air 124. The valves 130, 132 and the actuator 114 are controlled by a controller 122, realizable for example (like the controller 22) with an appropriately programmed PLC as readily imaginable for one skilled in the art.

In use, during the initial heating of the pressed part the breather remains closed as shown in solid lines in FIG. 2 so as to avoid the still not completely melted plastic coming out of the die.

After reaching the predetermined conditions for opening of the breather (for example, a predetermined temperature) the controller 122 opens the breather commanding the actuator 114 (as shown in broken lines in FIG. 2) and operating one of the valves 130, 132 for discharge, allowing leaking out of the gases. The plastic can no longer come out being completely melted.

If desired, during the cooling the step the controller commands the valve 130 to inject low-pressure air into the die while it commands the other valve 132 for discharging it. In case of pressed parts with very broad flat parts, this operation allows avoiding deformations and humps. In addition, cooling is accelerated.

With the die open, when the geometry of the part allows it, the controller can also command the valve 132 to inject air under pressure into the pressed part which, due to the effect of the pressure generated, is expelled from the die. It is now clear that the preset purposes have been achieved by making available a rotational die equipped with an 'intelligent' breather with active programmed control. Thanks to application of the principles of this invention the breather can be activated and create communication between the inside and the outside at the desired moment or under a determined condition, for example, of temperature. The operations of cleaning of the passage hole are also avoided since, remaining closed in the first die-heating step, it does not allow the still dusty plastic material to enter into the hole. Nor is the use of filters and their maintenance necessary. The function of expeller of the pressed part can also be performed and allow injection of air in the cooling step to accelerate the pressing operations. The possibility of injecting air under pressure in the cooling step allows reducing or avoiding humps and deformation. Thanks to the possibility of inserting sensors through the valve also allows detection of internal parameters of the die as, for example, air temperature. The alternative use of the radial passages in the rod or the mouth 18, 118 of the valve body allows blowing air under pressure between walls of the die and the part or inside the part.

Naturally the above description of an embodiment applying the innovative principles of this invention is given by way of non-limiting example of said principles within the scope of the exclusive right claimed here. For example, the rotational structure of the die can be of any known type and it has not been shown since it is readily imaginable to one skilled in the art. Also, in addition to or in replacement of the air sources, it is possible to use sources of appropriate gases under pressure. This allows, for example, injection of inert gases into the die during pressing of materials sensitive to air oxidation. Depending on specific operational needs, the programmed sequence of connection to the sources and discharges made by the controller can be different from that described above.

What is claimed is:

1. Die for rotational pressing, said die comprising
   a breather device for connection of an interior of the die with an exterior of the die, said breather device including a passageway between the interior and the exterior of the die for two way communication of air,
   said passageway being equipped with a valve, said valve being moved between an opened position and a closed position by an actuator piloted by a handling controller, said valve being moved from the closed position to the opened position and thereby opening the passage to flow of air after a first step of the pressing process,
   the valve including a shutter, the shutter being moved between the open and closed positions by the actuator through a control rod, the shutter sealingly traversing a wall of the die against air flow at a chamber of a valve body,
   the control rod having an axial passage communicating with the outside of the control rod through radial passages near the shutter for communication with the interior of the die upon opening movement of the shutter towards the interior of the die,
   a source of air under pressure connected in a controlled manner to said chamber of the valve body to injects upon commands air under pressure into the die when the shutter and valve are in the opened position, and
   a sensor element traversing axially the shutter to project into the die.

2. Die in accordance with claim 1, wherein the sensor element is a temperature sensor connected to the handling controller to control opening of the valve upon reaching a predetermined temperature detected by the sensor.

3. Die in accordance with claim 1, wherein the compressed airsource connected in a controlled manner to said axial passage in the control rod to inject, on command, air under pressure into the die through the radial passages when the valve is in the opened position.

4. Die in accordance with claim 1, further comprising means of controlled connection of the chamber alternately with the source of air under pressure or to a discharge to the exterior of the die.

5. Die in accordance with claim 1, further comprising means of controlled connection of the axial passage in the control rod alternately to the source of air under pressure or to a discharge to the exterior of the die.

6. Die in accordance with claim 4, wherein the controlled connection means include at least one connection valve which is connected to said controller to perform a programmed connection sequence during a die pressing cycle.

7. Die in accordance with claim 5, wherein the controlled connection means include at least one connection valve which is connected to said controller to perform a programmed connection sequence during a die pressing cycle.

8. Die in accordance with claim 1, wherein said axial passage in the rod has a breather opening which communicates with the exterior of the die.

9. Die in accordance with claim 1, wherein a controller controls injection of air under pressure into the die during a die cooling step.

10. Die in accordance with claim 3, wherein a controller controls injection of air under pressure into the die during a die cooling step.

* * * * *